May 16, 1933.     M. MALLORY     1,909,777
VARIABLE AIR INLET FOR FUEL INTAKE PASSAGE
Filed Aug. 17, 1931
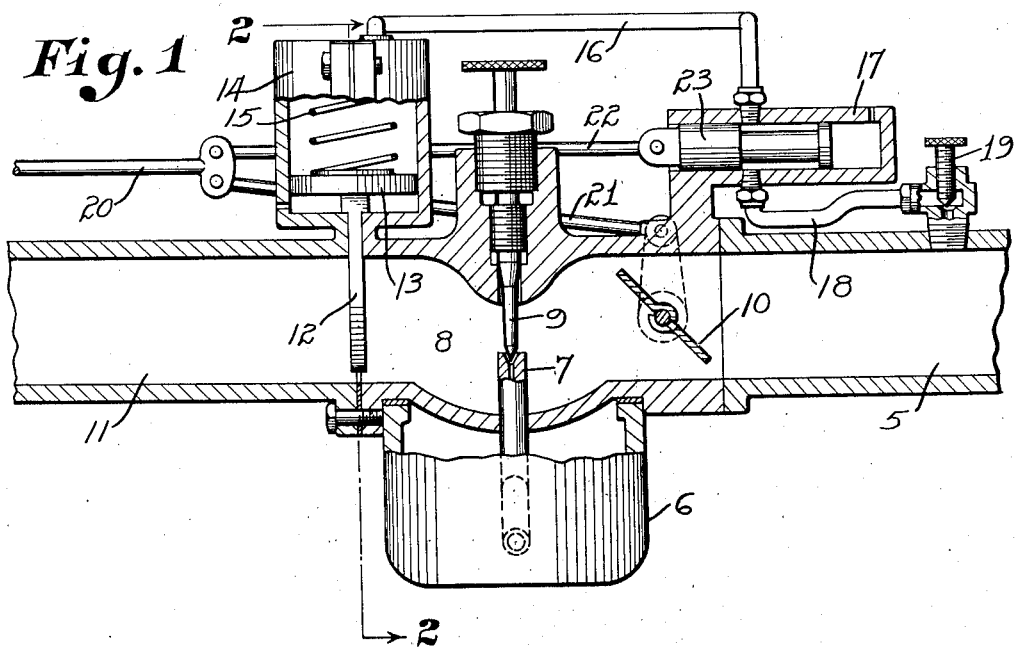
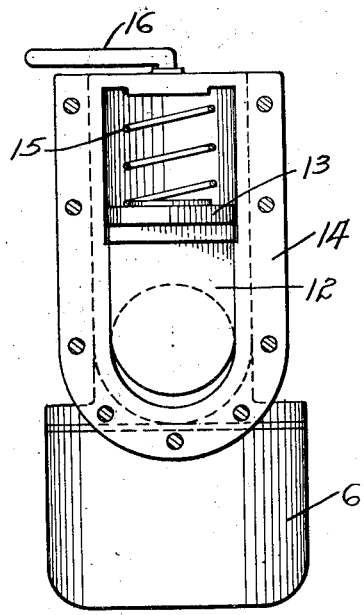
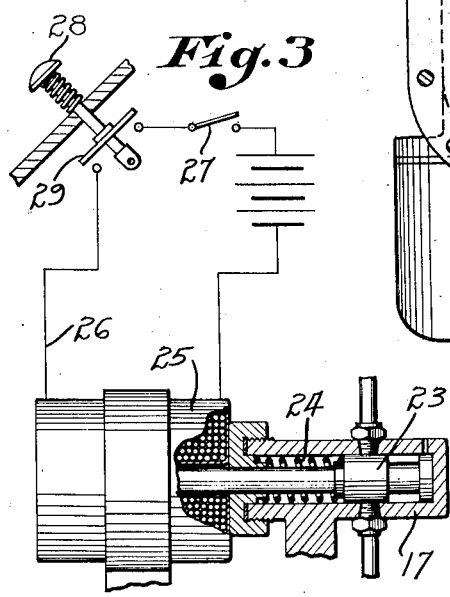
Inventor
Marion Mallory
By Owen & Owen
Attorneys Patented May 16, 1933

1,909,777

UNITED STATES PATENT OFFICE

MARION MALLORY, OF TOLEDO, OHIO, ASSIGNOR TO THE MALLORY RESEARCH COMPANY, A CORPORATION OF DELAWARE

VARIABLE AIR INLET FOR FUEL INTAKE PASSAGE

Application filed August 17, 1931. Serial No. 557,446.

This invention relates to the fuel intake passage for internal combustion engines and particularly to a variable air inlet therefor including a valve controlled by the conditions under which the engine is operated, with the object of increasing the efficiency of the engine.

When the throttle is in idling position, it is desirable to admit through the intake passageway only a sufficient amount of air to take up the small amount of fuel drawn through the needle valve and to produce an explosive mixture. As the throttle is opened, more fuel is admitted at once to the intake, but the volume of air passing through the passageway is increased only after the speed of the engine increases.

The volume of air passing through the passageway is determined by a metering valve which, under predetermined operating conditions, is subject to control by the suction in the intake manifold and this in turn depends upon the speed of the engine and the position of the throttle valve. For example, the means for varying the position of the metering valve may be arranged for pneumatic control and communication between said means and the intake manifold may be controlled by either electrical or mechanical means adapted to be actuated by a movement of the throttle.

The invention and the method of its operation will be more particularly described with reference to the accompanying drawing, in which—

Figure 1 is a longitudinal section through the intake passageway having the invention associated therewith;

Figure 2 is a section taken substantially on the line 2—2 of Fig. 1; and

Figure 3 is a diagrammatic view illustrating electrical means for controlling the operation.

As illustrated in the drawing, the invention is associated with a fuel intake passageway 5 and a carburetor 6 which may be of any suitable construction having a fuel nozzle 7 leading into the chamber 8 which is a part of the intake passageway 5. The emission of fuel from the nozzle 7 may be adjusted by means of a needle valve 9.

A throttle valve 10 is located in the passageway 5 between the nozzle 7 and the engine. The fuel intake passageway has an air inlet 11 and the amount of air admitted to passage 5 is determined by a metering valve 12 which is mounted near the fuel nozzle 7 but on the side thereof opposite to the throttle valve 10. The metering valve 12 is provided with a head 13 mounted for reciprocation within a cylinder 14. A spring 15 within the cylinder 14 tends to hold the valve 12 in its lowermost position so that only a small stream of air is admitted through the chamber 8.

A pipe 16 connects the upper end of the cylinder 14 to a valve chamber 17 from which a pipe 18 leads past an adjustable valve 19 into the intake passageway 5 between the throttle valve 10 and the engine. The throttle rod 20 is connected by a link 21 to the throttle valve 10 and also has a link connection 22 with a control valve 23 mounted within the chamber 17.

When the throttle valve 10 is in position for idling, the valve 23 will be in a position to cut off communication between the pipe sections 16 and 18 so that the metering valve 12 will be held in a nearly closed position by the spring 15 as shown in Figs. 1 and 2. Under such conditions, a vacuum within the passageway 5 will have no effect upon the position of the valve 12. If the throttle valve is closed to decelerate the engine, the suction produced in the passageway 5 by the rapidly traveling engine will have the usual retardant effect upon the car.

When the throttle valve 10 is opened to increase the speed, the valve 23 is also moved to open communication between the intake passageway 5 and the cylinder 14. The valve 12 is not raised, however, until the speed of the engine increases and creates sufficient vacuum within the passageway 5 to overcome the tension of the spring 15. Then, as the speed increases the valve 12 is progressively opened. The result is that when the engine is operating under a heavy load and the throttle is first opened, the mixture is comparatively rich, but as the load becomes lighter or the speed increases, more air is added to the mixture.

In the modification illustrated in Fig. 3, the valve 23 is acted upon by a spring 24 which tends to close it. The stem of the valve 23 constitutes the core of a solenoid 25 and the latter when energized opens the valve 23 against the resistance of the spring 24. The circuit 26 to the solenoid may be provided with a manually operable switch 27. The accelerator 28 is provided with a circuit closer 29 which completes the circuit through the solenoid whenever the accelerator is depressed to open the throttle.

It is of course understood that various other means may be devised for shifting the valve 23 and the construction and operation of the other parts of the device may be considerably modified without departing materially from the scope of the appended claims.

I claim:

1. The combination with the fuel intake passageway of an internal combustion engine, of a fuel inlet to said passageway, a throttle valve in said passageway between the fuel inlet and the engine, an air inlet to the passageway, a metering valve for said air inlet, said fuel inlet being between the two valves, and means rendered operative by the opening of the throttle to subject said metering valve to pneumatic control in accordance with the pressure in the intake passageway, the position of the metering valve being independent of the pressure in the region of the fuel inlet.

2. The combination with the fuel intake passageway of an internal combustion engine, of a fuel inlet to said passageway, a throttle valve in the passageway between the fuel inlet and the engine, an air inlet valve on the other side of the fuel inlet, suction operable means for opening said air inlet valve, and means actuated by the opening of the throttle for establishing communication between said suction operable means and the intake passageway at a point between the throttle valve and engine.

3. The combination with the fuel intake passageway of an internal combustion engine, of an air inlet valve for said passageway, a throttle valve, means for holding the air inlet valve nearly closed as long as the throttle valve is in idling position, a fuel inlet to said passageway between the two valves, and means independent of the pressure in the region of the fuel inlet and rendered operative by the opening of the throttle valve to control the opening of said air inlet valve by suction developed in the intake passageway.

4. The combination with the fuel intake passageway of an internal combustion engine, of an air inlet valve for said passageway, a throttle valve, means for holding the air inlet valve nearly closed as long as the throttle valve is in idling position, suction controlled means to open said air inlet valve in opposition to said holding means, and means connected with the throttle valve for placing said suction controlled means in communication with the intake passageway only when the throttle valve is opened.

5. The combination with the fuel intake passageway of an internal combustion engine, of an air inlet valve to said passageway, a throttle valve, means operable by an increasing degree of vacuum in the intake passageway to progressively open said air inlet valve, and means for rendering said first mentioned means inoperative when the throttle is in idling position.

6. The combination with the fuel intake passageway of an internal combustion engine, of a fuel inlet to said passageway, a throttle valve in said passageway between the fuel inlet and the engine, control means for the throttle valve, an air inlet to the passageway provided with a metering valve, said fuel inlet being between the two valves, and means connected to the throttle valve control means for automatically subjecting said metering valve to pneumatic control in accordance with the pressure in the intake passageway, only when the throttle valve is open wider than idling position.

7. The combination with the fuel intake passageway of an internal combustion engine, of an air inlet valve for said passageway, a throttle valve, control means for the throttle valve, means for holding the air inlet valve nearly closed as long as the throttle valve is in idling position, a fuel inlet to said passageway between the two valves, another valve connected with the throttle valve control means, and means, rendering effective by said last mentioned valve, only when the throttle valve is open wider than idling position, to progressively open said air inlet valve as the speed of the engine increases.

In testimony whereof I have hereunto signed my name to this specification.

MARION MALLORY.